FRANKLIN D. KOTTLER
CLIFFORD G. VROOM
DEAN M. PETERSON
INVENTORS

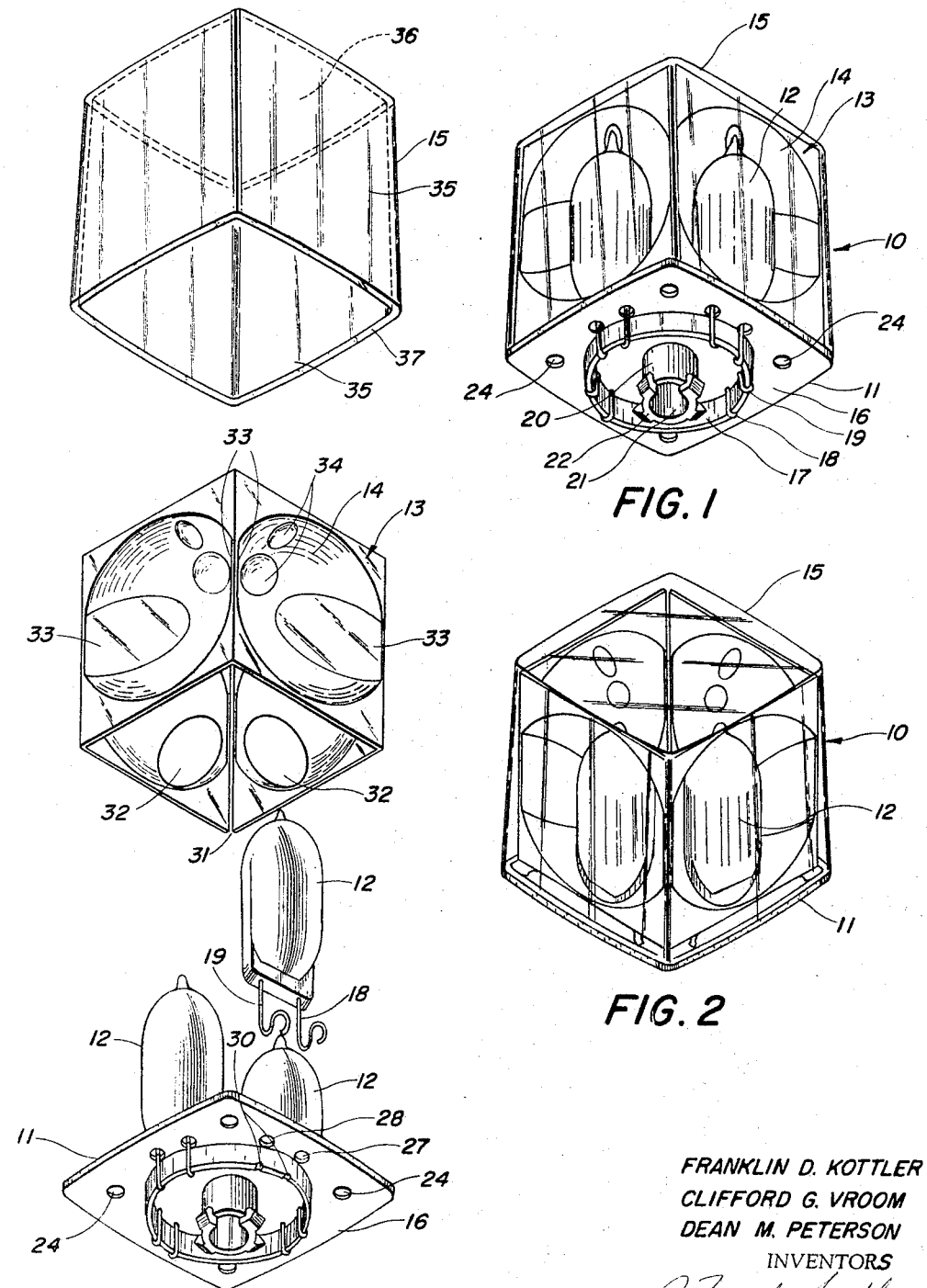

BY R. Frank Smith
Ronald S. Kaselen
ATTORNEYS

United States Patent Office 3,327,105
Patented June 20, 1967

3,327,105
DISPOSABLE MULTILAMP PHOTOFLASH UNIT
Franklin D. Kettler, Clifford G. Vroom, and Dean M. Peterson, all of Rochester, N.Y., assignors, by mesne assignments, to Sylvania Electric Products Inc., Salem, Mass., a corporation of Delaware
Filed Dec. 14, 1964, Ser. No. 417,914
6 Claims. (Cl. 240—1.3)

The present invention relates to flash photography, and more particularly, to a disposable package or unit containing a plurality of sequentially ignitable photoflash lamps with an individual reflector for each lamp fixed therein, and a connecting base for indexing and operating the unit.

While there has been a trend toward miniaturization of single use photoflash lamps for use in amateur photography, certain problems have been arising as a result. Miniaturized lamps are difficult to handle and require great care in order that proper insertion in suitable flash units may be accomplished. Similarly, the resulting heat of combustion after ignition can cause local burns when the photoflash lamps are removed after firing.

The present invention contemplates a single-use, easily handled package of photoflash lamps which is connected directly to a suitable camera flash circuit, and the package is indexed to successively place the lamps in the circuit. A light transmitting cover is provided for the package and indivdual reflectors are included such that a separate camera flash reflector is not needed, the individual reflectors being able to be designed particularly for the type of lamp included in the package. A connecting base portion attaching the package to a camera and having means to enable the indexing completes the package.

A particular object of the invention, therefore, is in the provision of a relatively inexpensive and disposable package containing a plurality of ignitable photoflash lamps and an individual reflector for each flash lamp, the package being designed to enable sequential firing of the lamps upon indexing or successive changes of position of the package.

Yet another object is in the provision of a disposable multilamp photoflash package having a versatile and rugged base connectable with a suitable socket in a photographic camera for sequential electrical connection of the lamps with a flash circuit in the camera to successively ignite the flash lamps with successive frames of photographic film.

A more particular object is in the provision of a multilamp photoflash package with a connecting base having a depending center post or spindle with spaced retaining lugs thereon to firmly retain the package in the camera package receiving socket for the positioning and sequential or successive ignition of the lamps, and a depending annular ring about which electrical lead-in wires of the photoflash lamps are bent to define electrical contact members for electrical connection with the camera flash circuit.

These and other objects and advantages will become apparent in the course of the following description of a preferred embodiment of the invention, the accompanying drawing forming a part thereof and wherein:

FIG. 1 is a perspective view of a disposable multilamp photoflash package or unit embodying the invention;

FIG. 2 is another perspective view of the multilamp photoflash package;

FIG. 3 is an exploded view of the multilamp photoflash package showing its various parts;

Figure 4:
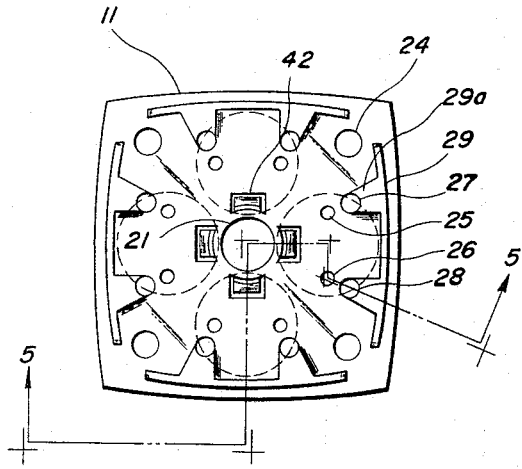
FIG. 4 is a plan view of the connecting base of the photoflash package.

As shown in FIGS. 1 and 2, the present invention comprises a disposable multilamp photoflash unit or package 10 having a connecting base portion 11 which is connectable with a suitable receiving socket in a photographic camera for selective electrical connection with the contact terminals of a flash circuit in the camera and four vertically arranged photoflash lamps 12 of a known shape and manufacture orthoganally spaced about the connecting base portion 11 against the top surface of the base (see FIG. 4). Each photoflash lamp comprises a hermetically sealed, light-transmitting glass envelope containing a combustion supporting gas under pressure and a charge of ignitable material which releases an amount of light of selected peak and duration when ignited by connection to a source of electrical potential.

Disposed between and separating the photoflash lamps 12 is a reflector portion 13 of preformed sheet material having a light reflective coating and defining an inwardly dished, individual light reflector surface 14 of suitable shape for each of the four photoflash lamps 12. A hollow transparent or light transmitting shield or cover 15 of substantially cubic shape is sealed to the top surface of the connecting base portion 11 and is disposed over the photoflash lamps 12 and the reflector portion 13.

Each of the photoflash lamps 12 and corresponding reflector surface 14 comprise a photoflash component suitable in itself for use in augmenting ambient light to achieve a desired amount of illumination. The selected photoflash component is connectable with a synchronizing flash circuit for ignition of the lamp 12 in timed relation with camera operation. Each photoflash component forms a complete attachment, without need for additional attachments or reflector structures other than the single connecting socket and the usual flash circuit elements such as batteries and a shutter synchronizing switch.

Reference now being made to FIGS. 1 and 3, the connecting base portion 11 includes a platform support 16 of substantially square shape with its edges being curved outwardly a slight amount. Integral with and extending downwardly from the support 16 is an annular contact ring 17. A pair of electrical lead-in wires 18, 19 extend from the interior of the glass envelope of each photoflash lamp 12 at its lower end in a manner which is known in the art. The lead-in wires 18, 19 pass downwardly through the platform support 16 and are wrapped by bending around both sides of the annular contact ring 17.

Centrally disposed within the area defined by the contact ring 17 and coaxial therewith is a depending cylindrical center post or spindle 20 which is also formed integrally with the base platform support 16. Center post 20 comprises the means for retaining the disposable package in a receiving socket and includes an internal package stabilizing bore 21 designed to receive a socket spindle and four radially outwardly extending lugs 22 uniformly spaced about the circumference of the post 20 at its lower end. The center post 20 is used for mating with a complementary receiving socket, for example, the receiving socket disclosed in the U.S. application filed of even date herewith in the name of Dean M. Peterson et al. and entitled, "Miniature Flash Attachment and Photoflash Lamp Socket Receiving Portion." The receiving socket disclosed in the Peterson application may form an integral part of a camera structure or the socket may comprise part of a separate flash attachment as disclosed. The retaining lugs 22 define lateral surfaces engageable with a receiving socket clamp for retaining the disposable multilamp photoflash package 10 in the complementary camera socket mechanism and as engagement means to index or reposition the unit by rotating the unit about the vertical axis of the center post 20 to successively present unused flash components in contact with the flash circuit after ignition of a prior lamp 12 in the manner described hereinafter.

Figure 5:
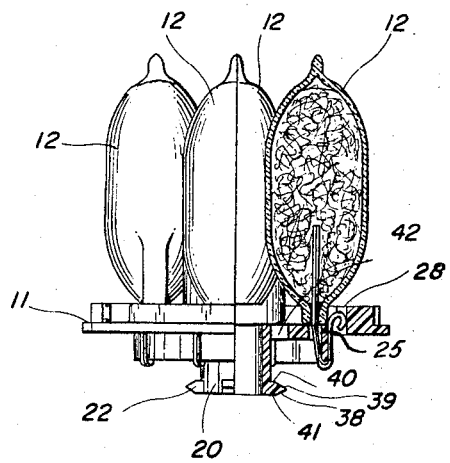
FIG. 5 is a side view of the connecting base and individual photoflash lamps in partial cross-section, taken on line 5—5 in FIG. 4.

As shown more particularly in FIG. 5, each of the lugs 22 is shaped to include a bottom flat 41 coplanar with the lower surface of the center post 20, a pair of ramp surfaces 38, 39 by which the package may be readily pushed into and pulled from engagement in the package receiving socket of a camera, and an upper flat 40 which may be used as a package retaining surface.

Figure 6:
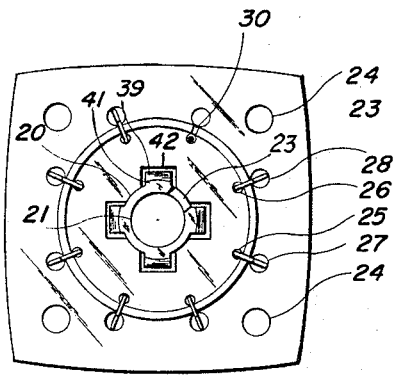
FIG. 6 is a bottom view of the multilamp photoflash package with one of the electrical lead-ins removed.

The base portion 16 may be constructed of a plastic material such as "White Dylene 80" by injection molding. In such a case, there may also be provided a plurality of mold openings 42 (shown only in FIGS. 4–6) through which the mold surfaces forming the ramps 39 and flats 40 are passed.

The platform support 16 further includes spaced openings 24 which enable the air space within the package to communicate with the ambient air to permit escapement of gas which may be developed from ignition of the respective photoflash lamps 12, thereby preventing gas pressure from developing. Vapor condensation on inner surfaces of the parts of the disposable package 10 due to ambient temperature changes is also eliminated by the provision of the openings 24.

The base platform support 16 further defines a first series of pairs of alternate lead-in wire openings 25, 26 circumferentially spaced about the annular contact ring 17 along its inner side and a second series of pairs of alternate lead-in wire openings 27, 28 circumferentially spaced about the annular ring 17 along its exterior side and in radial alignment respectively with the inner openings 25, 26. Each pair of alternate openings is symmetrically located along a side of the platform support 16. As seen from FIGS. 2 and 5, and in phantom in FIG. 4, the photoflash lamps 12 rest on the top surface of the platform support 16 on a side thereof equidistant from adjacent sides, and the lead-in wires 17, 18 are bent to extend vertically downward through the respective inner openings 25, 26, around the bottom peripheral edge of contact ring 17 and vertically upward into the respective outer openings 27, 28. The ends of the lead-in wires 18, 19 are curled outwardly and are securely anchored within the respective outer openings 27, 28 by frictional fitting. To ensure anchoring of the ends of the lead-in wires, sealing rims 29, the purpose of which will be descirbed, are provided with inwardly extending boss-like proturbances 29a which increase the height of the walls of openings 27, 28 along the points of engagement with the lead ends. Finally, the annular contact ring 17 is provided with a plurality of radial grooves 30 at its lower peripheral edge, each of which underlie one of the lead-in wires 18, 19 to seat the respective wire therein and prevent accidental lateral displacement from the designed position of contact during use of the package.

The reflector portion 13 is comprised of a single rectangular piece of preformed and aluminum coated, inexpensive sheet material such as a polystyrene or butyrate thermoplastic. The piece of sheet material is folded at right angles and brought together at 31 to define the four individual reflector sections. Each reflector section includes an inwardly dished reflector surface 14 of substantially parabolic shape surrounding the respective photoflash lamp 12. The lower region of each surface includes a lamp opening 32 through which the respective photoflash lamp 12 is passed for positioning in front of the reflector surface 14.

In order to conform to the cubic shape of the package and to provide a limited horizontal light scattering, useful in view of the elongated shape of each of the photoflash lamps 12, each reflector surface 14 also includes a pair of laterally disposed flat surfaces 33 extending radially inwardly from the corners of the package toward its center. For a more compact package, each reflector surface 14 may also include recessed portions 34 accommodating protuberances of the photoflash lamps 12. It is now apparent that a separate permanent reflector is not needed, and each reflector, being a part of the package, can be properly designed for the particular lamps used in the package.

A transparent, or light transmitting shield 15 is provided as a cover for the lamps 12 and the reflector portion 13. The shield 15 is preferably made of a single moulded piece of inexpensive plastic such as polystyrene and comprises four side walls 35 of rectangular shape bowed slightly outwardly, and a top wall 36 having a substantially square shape like that of the base platform support 16. The common bottom edge 37 of the shield 15 is permanently affixed to the base support 16 at the outer edges of the sealing rims 29 by suitable means, as for example, by adhesive, heat sealing or sonic sealing. The shield 15 provides a protection from exploding lamps and it prevents a direct touching of the individual lamps 12.

In operation the disposable multilamp photoflash package or unit 10 is placed in a suitable socket receiving portion of a camera with the assecible part of the lead-in wires 17, 18 of the photoflash lamp 12 facing the direction of the camera objective axis engaging terminal contacts of a photographic camera flash circuit. Upon firing of the "in circuit" photoflash lamp 12 in timed relationship with shutter operation of the photographic camera in a known manner, the unit 10 is then indexed by rotating the unit about the center post axis until a subsequent photoflash lamp 12 faces the direction of the camera objective axis with its corresponding lead-in wires 17, 18 engaging the terminal contacts of the flash circuit. Of course, the unit 10 may be removed at any time after the firing of any one or more of the inserted flash lamps, and the unit 10 may simply be discarded after all of the photoflash lamps 12 have been used.

Although each of the flash lamps 12 have been miniaturized to an overall outer diameter of 0.385 inch with a glass height of 1.03 inches, the package has an overall horizontal diagonal dimension of 1.4 inches with a 1.1 inch face dimension and a height exclusive of the center post or spindle of approximately 1.125 inchs, thereby making the package itself quite compact and easy to handle by an amateur photographer.

It may now be seen that the present invention comprises a disposable multilamp photoflash unit which may be readily manufactured and easily handled by amateur photographers. The base portion of the disposable photoflash unit provides a rugged means for retaining the unit in a corresponding camera socket and indexing the cube about its axis of rotation, and the flash lamp lead-in wires are positioned about a contact ring to permit the use of diverse means for electrical contact with suitable flash circuit terminals.

While the present invention has been described with respect to the disclosed embodiment, it is of course apparent that various modifications can be resorted to without departing from the spirit of the invention or the scope of the subjoined claims.

We claim:

1. In a unitary disposable multilamp photoflash package connectable to a photoflash device and having a plurality of photoflash lamps each ignitable to emit a flash of light of predetermined intensity and duration for augmenting scene light, the improvement comprising:

a platform support and means mounting the plurality of photoflash lamps on the platform support uniformly about a central axis of the platform support, a contact ring depending below the platform support, a pair of electrical lead-in wires extending from each of the flash lamps to below the platform support through openings therein and vertically around the periphery of the contact ring, a cylindrical post, coaxial with the contact ring, on the central axis and depending from the platform support, said post being insertable in a photoflash device receiving socket to successively connect the pairs of lead-in wires to flash circuit terminals of a photoflash device, and a plurality of lugs, extending radially outwardly from the post adjacent the lower end of the post, to releasably hold the package in a photoflash device receiving socket, each of said lugs including an upper ramped surface and a lower ramped surface, the ramped surfaces being inclined from the horizontal to facilitate insertion and removal.

2. In a unitary disposable multilamp photoflash package connectable to a photoflash device and having a plurality of photoflash lamps each ignitable to emit a flash of light of predetermined intensity and duration for augmenting scene light, the improvement comprising:

a platform support and means mounting the plurality of photoflash lamps on the platform support uniformly about a central axis of the platform support, a contact ring depending below the platform support, a pair of electrical lead-in wires extending from each of the flash lamps to below the platform support through openings therein and vertically around the periphery of the contact ring, a cylindrical post, coaxial with the contact ring, on the central axis and depending from the platform support, said post being insertable in a photoflash device receiving socket to successively connect the pairs of lead-in wires to flash circuit terminals of a photoflash device, said post defining a single indexing notch at its periphery for insertion of the post in a photoflash device receiving socket in a single predetermined position to place a preselected one of the photoflash lamps with its corresponding pair of lead-in wires connected to the circuit terminals, and a plurality of lugs, extending radially outwardly from the post adjacent the lower end of the post, to releasably hold the package in a photoflash device receiving socket, each of said lugs including an upper ramped surface and a lower ramped surface, the ramped surfaces being inclined from the horizontal to facilitate insertion and removal.

3. In a unitary disposable multilamp photoflash package connectable to a photoflash device and having a plurality of photoflash lamps each ignitable to emit a flash of light of predetermined intensity and duration for augmenting scene light, the improvement comprising:

a platform support and means mounting the plurality of photoflash lamps on the platform support uniformly about a central axis of the platform support, a contact ring depending below the platform support, a pair of electrical lead-in wires extending from each of the flash lamps to below the platform support through openings therein and vertically around the periphery of the contact ring, said platform support defining a vertical opening on each side of the contact ring for each lead-in wire, each lead-in wire extending down from the respective flash lamp through one opening around the periphery of the contact ring and upwardly through the other opening, a cylindrical post, coaxial with the contact ring, on the central axis and depending from the platform support, said post being insertable in a photoflash device receiving socket to successively connect the pairs of lead-in wires to flash circuit terminals of a photoflash device, and a plurality of lugs, extending radialy outwardly from the post adjacent the lower end of the post, to releasably hold the package in a photoflash device receiving socket, each of said lugs including an upper ramped surface and a lower ramped surface, the ramped surfaces being inclined from the horizontal to facilitate insertion and removal, 4. In a unitary disposable multilamp photoflash package connectable to a photoflash device and having a plurality of photoflash lamps each ignitable to emit a flash of light of predetermined intensity and duration for augmenting scene light, the improvement comprising:

a platform support and means mounting the plurality of photoflash lamps on the platform support uniformly about a central axis of the platform support, a contact ring depending below the platform support, a pair of electrical lead-in wires extending from each of the flash lamps to below the platform support through openings therein and vertically around the periphery of the contact ring, said platform support defining a vertical opening on each side of the contact ring for each lead-in wire, each lead-in wire extending down from the respective flash lamp through one opening around the periphery of the contact ring and upwardly terminating in the respective other opening and affixed therein, a cylindrical post, coaxial with the contact ring, on the central axis and depending from the platform support, said post being insertable in a photoflash device receiving socket to successively connect the pairs of lead-in wires to flash circuit terminals of a photoflash device, and a plurality of lugs, extending radially outwardly from the post adjacent the lower end of the post, to releasably hold the package in a photoflash device receiving socket, each of said lugs including an upper ramped surface and a lower ramped surface, the ramped surfaces being inclined from the horizontal to facilitate insertion and removal.

5. In a unitary disposable multilamp photoflash package connectable to a photoflash device and having a plurality of photoflash lamps each ignitable to emit a flash of light of predetermined intensity and duration for augmenting scene light, the improvement comprising:

a platform support and means mounting the plurality of photoflash lamps on the platform support uniformly about a central axis of the platform support, a contact ring depending below the platform support, a pair of electrical lead-in wires extending from each of the flash lamps to below the platform support through openings therein and vertically around the periphery of the contact ring, said platform support defining a vertical opening on each side of the contact ring for each lead-in wire, each led-in wire extending down from the respective flash lamp through one opening around the periphery of the contact ring and upwardly terminating in the respective other opening and affixed by looping in the respective other opening, a cylindrical post, coaxial with the contact ring, on the central axis and depending from the platform support, said post being insertable in a photoflash device receiving socket to successively connect the pairs of lead-in wires to flash circuit terminals of a photoflash device, and a plurality of lugs, extending radially outwardly from the post adjacent the lower end of the post, to releasably hold the package in a photoflash device receiving socket, each of said lugs including an upper ramped surface and a lower ramped surface, the ramped surfaces being inclined from the horizontal to facilitate insertion and removal.

6. A unitary disposable multilamp photoflash package for use in a photoflash circuit comprising:

a horizontal platform support having a plurality of defined lateral edges;

a plurality of photoflash lamps vertically mounted on the upper surface of the platform support about a central vertical axis thereof, each photoflash lamp being positioned symmetrically with respect to one of the lateral edges of the support;

reflector surface means disposed behind each of the photoflash lamps for defining a pattern of emitting light from the photoflash lamp along a line extending radially outwardly from the respective one lateral edge;

an integral protective cover portion having a top wall and a plurality of light transmitting side walls and means affixing the cover portion to the platform support and enclosing the photoflash lamps with each of the sidewalls being adjacent a corresponding lateral edge, a pair of lead-in wires extending from each of the photoflash lamps, a contact ring about the vertical axis extending vertically below the platform support with the lead-in wires of the photoflash lamps being wrapped vertically around the periphery of the contact ring for selective electrical connection of the pair of lead-in wires of one photoflash lamp to place the said one photoflash lamp in a photoflash circuit, said platform support defining a vertical opening on each side of the contact ring for each lead-in wire, each lead-in wire extending down from the respective flash lamp through one opening around the periphery of the contact ring and upwardly into the other opening, and means on the central axis to provide selective rotation of the package about the central axis to electrically connect the pair of lead-in wires of others of the plurality of photoflash lamps successively in the photoflash circuit.

References Cited

UNITED STATES PATENTS 3,096,025 7/1963 Prochnow _____ 240—1.3
3,244,087 4/1966 Anderson _____ 95—11

FOREIGN PATENTS 561,466 8/1958 Canada.
1,294,025 4/1962 France.

JOHN M. HORAN, *Primary Examiner.*